(12) United States Patent
Koh et al.

(10) Patent No.: US 6,335,725 B1
(45) Date of Patent: Jan. 1, 2002

(54) METHOD OF PARTITIONING A TOUCH SCREEN FOR DATA INPUT

(75) Inventors: Joo Beng Koh; Kok Seng Choo, both of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/357,343

(22) Filed: Jul. 14, 1999

(51) Int. Cl.[7] ............................. G06F 13/00; G09G 5/00
(52) U.S. Cl. ..................... 345/173; 345/784; 345/808; 345/825; 345/864
(58) Field of Search ................................. 345/358, 339, 345/352, 825, 808, 864, 784, 173; 395/653, 160; 340/712

(56) References Cited

U.S. PATENT DOCUMENTS

| | | | | |
|---|---|---|---|---|
| 5,119,079 A | * | 6/1992 | Hube et al. ................. | 340/712 |
| 5,297,253 A | * | 3/1994 | Meisel ....................... | 395/160 |
| 5,682,529 A | * | 10/1997 | Hendry et al. ............. | 395/653 |
| 5,745,116 A | * | 4/1998 | Pisutha-Arnond .......... | 345/358 |
| 6,011,554 A | * | 1/2000 | King et al. ................. | 345/352 |
| 6,037,937 A | * | 3/2000 | Beaton et al. ............. | 345/339 |
| 6,181,344 B1 | * | 1/2001 | Tarpenning et al. ........ | 345/358 |

* cited by examiner

*Primary Examiner*—Bipin Shalwala
*Assistant Examiner*—David L Lewis

(57) ABSTRACT

A method of partitioning a touch screen into two portions, a main portion and a secondary portion, for data input is disclosed. The touch screen is mounted overlying a display. The assembly of the touch screen and the display is mounted on a casing of an electronic device suitable for executing an application software. The application software displays appropriate information on the display to indicate that the input touch panel is partitioned. A user is able to enter a first set of input commands using the main portion. These input commands are preferably entered using a stylus. The secondary portion is preferably for the user to enter another set of input commands, selected from the first set, which improves the usability of the electronic device when being used on the move. The user's hand which holds the electronic device when on the move can also activate the secondary portion.

7 Claims, 4 Drawing Sheets

METHOD OF PARTITIONING A TOUCH SCREEN FOR DATA INPUT

FIELD OF INVENTION

This invention relates to a method of using a touch-screen input panel on a computing device and more particularly to a method of using a touch-screen input panel in a handheld personal computer (H/PC).

BACKGROUND

Several types of input devices for computers are available. One such input device is the familiar "mouse". To date, the "mouse" is by far the most popular input device used with desk top computer systems. Generally, they provide a user-friendly input device for computer systems for both technical and non-technical applications. The popularity which these devices have achieved in the art has fostered the explosive growth of the personal computer industry, since they provide users a simple means to input data to the computers.

A mouse generally requires a flat surface on which it can interface to operate. The mouse couples to the flat surface to translate movement of the mouse to an input signal for processing by a computer. There are several types of mouse devices, all of which require a flat surface to operate. Thus, the mouse is unsuitable for any work area which cannot provide space for such a surface. The current and growing popularity of laptop and notebook computers thus has created a significant problem for mouse-type technologies which require a surface to operate. Laptops and notebooks are generally used in small, confined areas such as, for example, airplanes, where there is insufficient room to provide such a surface.

Designers of laptops and notebooks have come up with a tactile sensing input device which does not require a surface. Such a tactile sensing device uses several technologies to determine an object's position on the grid. These technologies used include electrodes, resistive networks, surface acoustic waves and other types of technology. The tactile sensing or touch-sensitive device translates the touch location to input signals for processing by a computer. Unlike the use of a mouse to position a cursor, a user touches and moves a finger on the touch sensitive device to position a cursor. There is no need for an external surface for such a touch sensitive device to work. This touch-sensitive device is integrated into a casing of a laptop or a notebook computer, usually in a medial position, adjacent to a keyboard and close to a user. With this device, a user can operate a laptop or notebook computer in a confined area, requiring only enough space to support the computer. However this touch-sensitive device, which usually has a touch surface measuring approximately 1.5 by 2 inches, is unsuitable for any computing device which is smaller in size than a laptop or a notebook computer. Handheld personal computers (H/PCs) which are built to fit comfortably into a user's palm cannot possibly accommodate such a touch-sensitive device without an increase in its physical size. Thus, there is still a problem with space when smaller-sized computers are desired.

Designers of H/PCs have solved the space problem by using yet another type of input devices. These input devices are generally designed to overlay a H/PC display and do not occupy more space than the display. These display devices are also touch sensitive and are generally known as digitizers or touch panels. A touch panel has a conductive faceplate. A touch anywhere on this conductive faceplate changes electrical impedances on the faceplate's conductive coating. These impedances when measured can be used to indicate the location of the touch. The impedances are measured at electrodes located on different edges of the faceplate. These devices generally meet the need of a H/PC user when the H/PC is placed on a firm surface. However, when on the move, it is inconvenient for a user to hold the H/PC in one hand and to use a stylus to operate the touch panel. The user will find it difficult to aim the tip of the stylus at indicia on the H/PC touch panel when on the move.

Hard icons located on one side of a touch panel are provided on some H/PCs to allow easier operation of these H/PCs while being used on the move. A user uses these hard icons to enter commonly-used inputs while on the move. Some examples of these commonly-used inputs are scrolling up, scrolling down and switching of application type of inputs. These hard icons cannot be used to capture an entire range of inputs which a full-screen touch panel allows. There are several disadvantages associated with these hard icons. One disadvantage is the limited space on a touch panel on which only a couple of hard icons can be accommodated. Thus, only a handful of features can be activated using this limited number of hard icons. Another disadvantage of hard icons is that user-programmable hard icons do not truly reflect underlying features with which the hard icons are programmably associated. Another disadvantage of hard icons is that they are not application-specific but are global. The hard icons may have to be programmed to suit different applications.

The foregoing therefore creates the need for a more user-friendly method of inputting data into a H/PC.

SUMMARY

In one aspect, an input and output system embodying the invention is mounted on an electronic device. This electronic device is used for executing an application software. The input and output system has a display and an input touch panel. The input touch panel is mounted overlying the display. The input touch panel is partitionable into a main input portion and a secondary input portion. The application software is able to receive a first set of input commands through the main input portion. The secondary input portion is used by the application software to receive a second set of input commands selected from the first set of input commands. A digit on a hand that is used to hold the electronic device can access this secondary input portion.

In another aspect, the present invention may be implemented as a method of using an input touch panel on an electronic device which also has a display. The method preferably includes partitioning the input touch panel into a main input portion and a secondary input portion for a user to interact with an application software running on the electronic device. The application software displays appropriate information on the display to indicate that the input touch panel is partitioned. Preferably, the user is able to enter a first set of input commands using the main input portion. These input commands are preferably entered using a stylus. The secondary input portion is preferably for the user to enter a second set of input commands, which is selected from the first set of input commands. The secondary input portion is accessible by a digit on a hand that is used to hold the electronic device.

BRIEF DESCRIPTION OF DRAWINGS

The invention will be better understood with reference to the drawings, in which.

DETAILED DESCRIPTION OF THE PREFERRED EMBODIMENT

Figure 1:
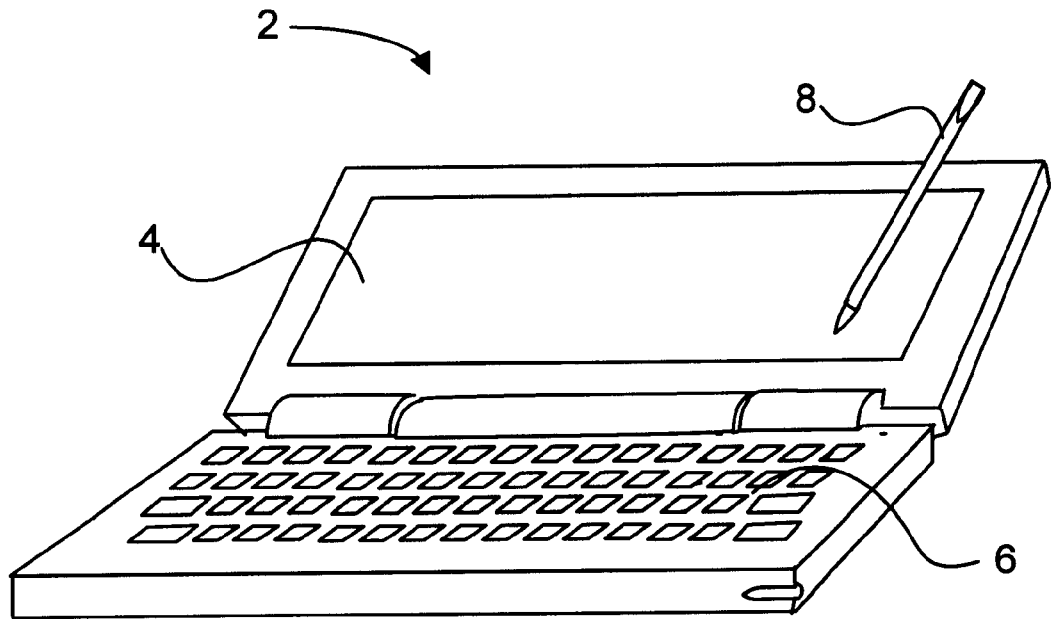
FIG. 1 is an isometric diagram of a stylus-based handheld personal computer (H/PC) having a partitioned input panel.

A method embodying the invention is described in terms of a device driver residing in a computing device such as a handheld personal computer (H/PC). FIG. 1 is a typical pen-based H/PC 2. The H/PC 2 has a display and input assembly 4, a QWERTY keyboard 6, a memory (not shown), a pen or stylus 8 and a processor (not shown). An operating system (OS) which manages the operations within the H/PC 2 resides in the memory. The display and input assembly 4 is both an input and an output device. When acting as an output device, the assembly 4 receives data from the processor and displays that data on a suitable display screen. The display screen is preferably a liquid crystal display (LCD), which is also known as a liquid crystal module (LCM). Such a LCM relies on absorption of ambient light to differentiate displayed dots or segments from a reflective background. The input device of the display assembly 4 is preferably a thin, transparent membrane which covers the LCM. This input device is sensitive to the position of the stylus 8 on its surface. The membrane of the display assembly 4 serves as an input tablet or panel. This clear membrane may use mechanical buttons, crossed beams of infrared light, acoustic surface waves, capacitance sensing, resistive sensing, and other sensing methods to detect the position of the stylus 8 on its surface.

Figure 2:
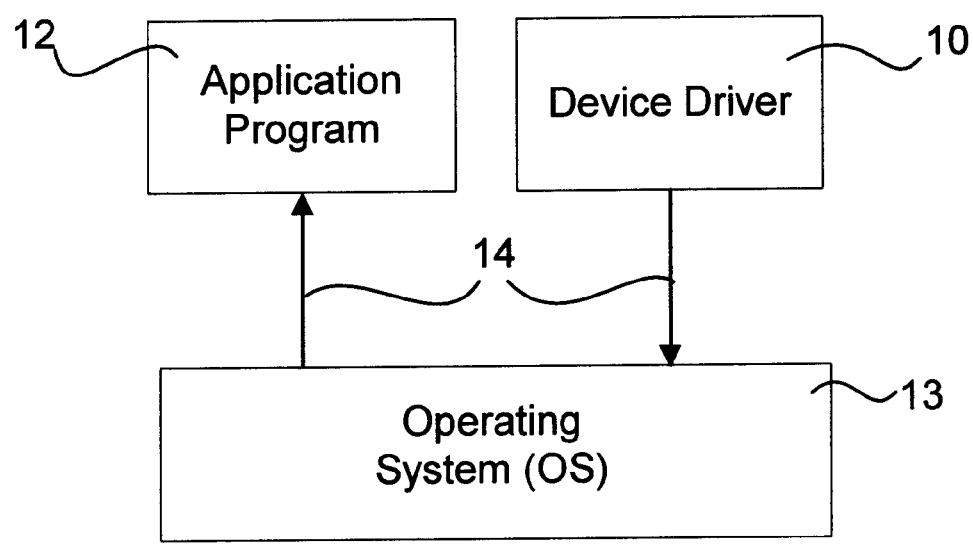
FIG. 2 is a block diagram showing interactions of software components of the H/PC of FIG. 1. One of the software components is a device driver in which the invention is suitably implemented.

FIG. 2 is a block diagram showing a device driver 10 suitable for implementing the current invention and an application program 12 which uses services provided by the device driver 10 to make use of the invention. An example of the application program 12 is a Contacts application. This Contacts application is used for storing and searching for personal information such as names, addresses and telephone numbers of friends and business contacts. The device driver 10 polls associated electronics to detect an object's touch or movement on the input panel. Alternatively, the device driver 10 can be programmed to respond to an interrupt when the input panel is touched. The device driver 10 interprets the object's touch or movement and makes an appropriate application-programming-interface (API) call to the Contacts application 12, via the OS 13 as indicated by arrows 14 in FIG. 2. If this touch or movement is recognized, the application program 12 takes an appropriate action. If the input or movement is not recognized, the application program 12 or the device driver 10 may simply ignore or sound an alarm to alert a user of the unrecognizable input.

Figure 3:
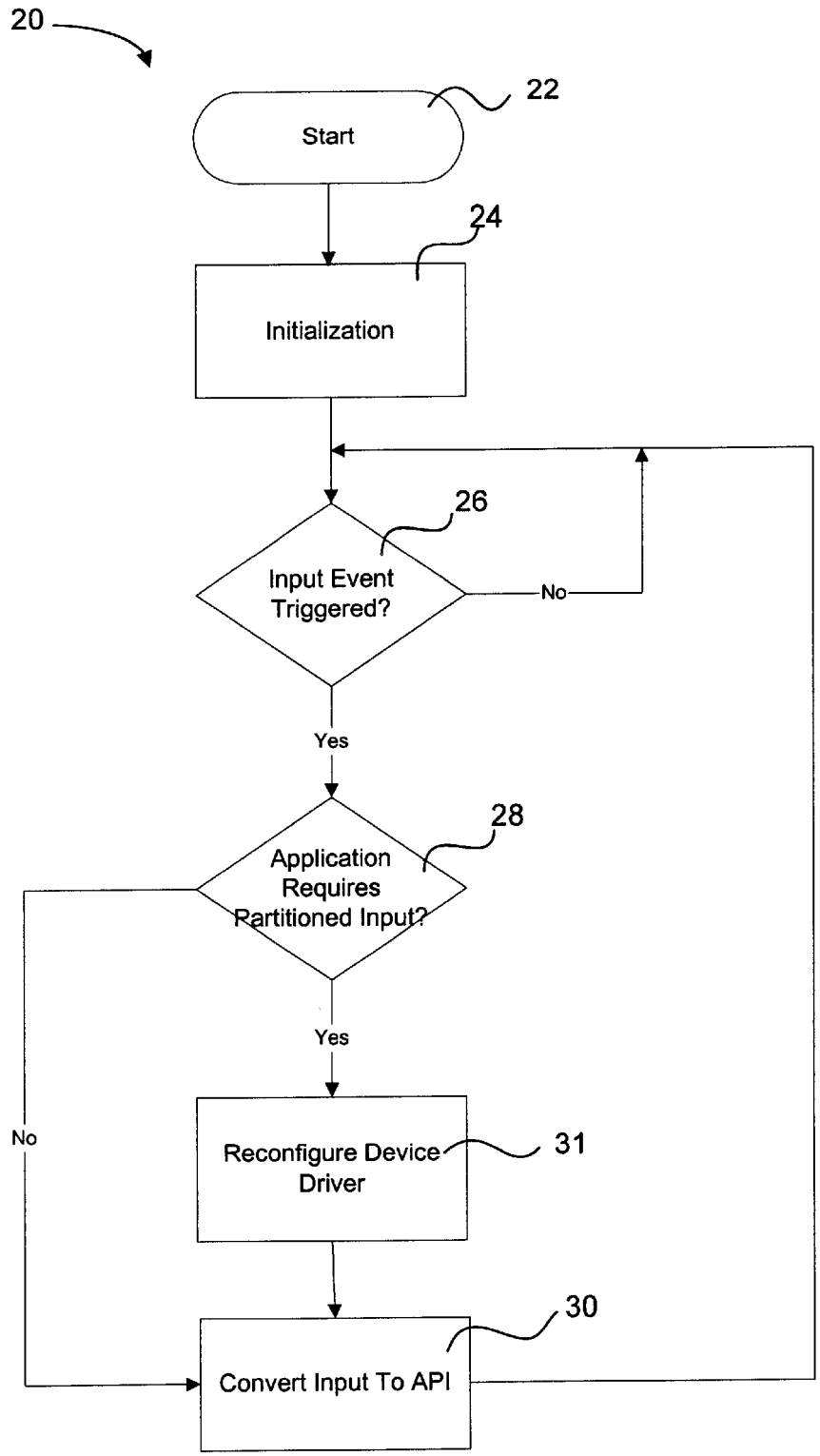
FIG. 3 is a flowchart illustrating the steps of implementing a partitioned input panel.

The operation sequence 20 embodying the method of partitioning of an input panel according to this invention is described with reference to FIG. 3. The method is described as implemented in but not limited to the device driver 10 of FIG. 2. The sequence 20 starts in a START step 22, and proceeds to an INITIALIZATION step 24. In this INITIALIZATION step 24, initialization of electronics associated with the input panel is performed. The entire input panel is also configured as a single input panel as a default configuration. A mode of the input panel is set to reflect this default configuration. After the INITIALIZATION step 24, the sequence 20 proceeds to an INPUT EVENT TRIGGERED? decision step 26, wherein the device driver 10 loops or waits in this step 26 for an input on the input panel.

If an object is detected as touching the input panel 4, the sequence 20 proceeds to an APPLICATION REQUIRES PARTITIONED INPUT? decision step 28, where the device driver 10 queries the application program 12 to check if a partitioned input panel is required. If it is determined in this step 28 that the application program 12 does not require a partitioned input panel, the sequence 20 proceeds to a CONVERT INPUT TO API step 30, wherein the information related to the touch panel is forwarded to the application program 12 for processing. This method is well known to those skilled in the art. In such a case where no partitioned input panel is required on a device which has a LCM that runs the entire length of a display and input assembly 4, the entire LCM can be utilized by the application program 12 for display purposes.

Figure 4:
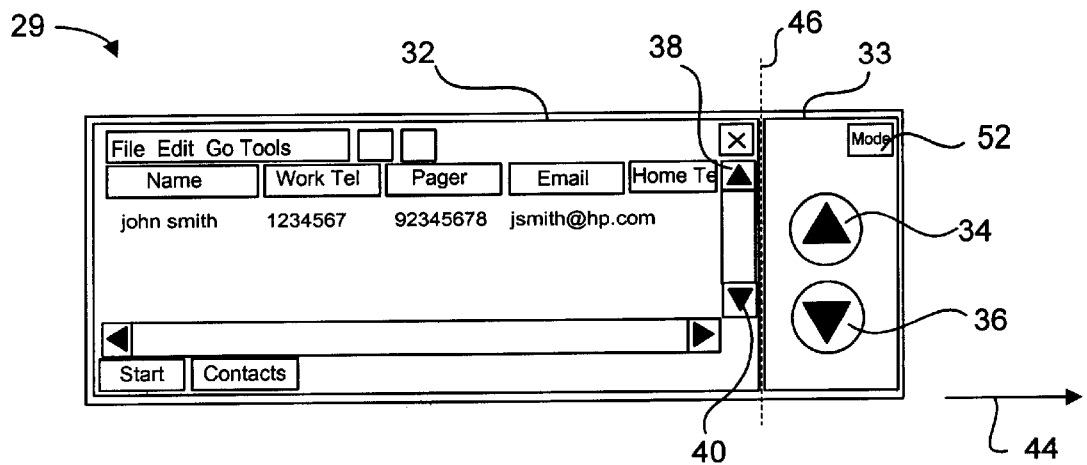
FIG. 4 is an example of a screen display associated with the use of a partitioned input panel.

If, however, it is determined in the APPLICATION REQUIRES PARTITIONED INPUT? step 28 that the application program 12 requires a partitioned input, the sequence 20 proceeds to a RECONFIGURE DEVICE DRIVER step 31. In this step 31, the device driver 10 checks the current mode of the input panel. If the mode reflects a default configuration, the device driver 10 will proceed to configure the input panel into a partitioned-input-panel configuration. In this configuring, the device driver 10 divides the touch panel into multiple, for example two, logical, contiguous and separate portions. For a configuration of two portions, there is a main portion and a secondary portion. These two portions can correspond to two similarly partitioned display portions under the control of the application program 12. FIG. 4 shows a partitioned display 29 suitable for use with a partitioned input panel. In the description which follows, a main portion 32 is used to describe both the main portion of the display and its corresponding portion of the input panel. Similarly, a secondary portion 33 refers to the secondary portion of the display and its corresponding secondary portion of the input panel. The main portion 32 is used in much the same way as in prior art H/PCs, where an application program 12 uses the main portion 32 to allow interactions with a user. The application program 12 displays data and program indicia on this main portion 32. The user enters user data and a first set of input commands on this main portion 32 to interact with the application program 12. If the user wishes, the user can rely solely on this main portion 32 to interact with the application program 12, as in existing H/PCs.

Figure 5:
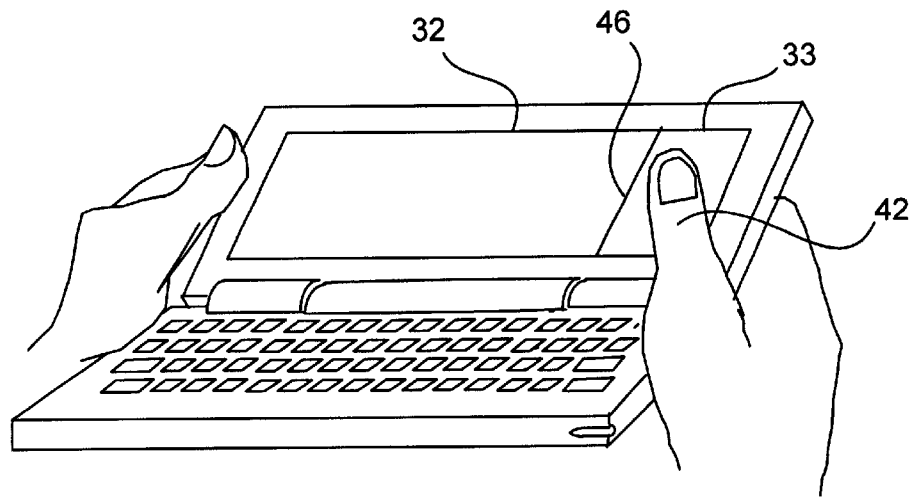
FIG. 5 is an isometric diagram showing how the H/PC of FIG. 1 can be firmly held and how the partitioned input panel of FIG. 4 can be activated by a digit of a hand holding the H/PC.

The display in the secondary portion 33 may be used by the application program 12 to display application-specific indicia. These indicia serve as guides for the user when activating the secondary portion 33 of the input panel. Some examples of application-specific indicia are enlarged scroll-up and scroll-down buttons 34, 36 associated with a Contacts application. These enlarged button indicia 34, 36 allow easier activation by a user than the original scroll up and down indicia 38, 40 as provided by the application program 12. Due to the larger size of the enlarged indicia, the user can activate these enlarged indicia 34, 36 with relative ease while on the move. FIG. 5 shows how the secondary portion 33 can be activated using a digit on a hand, such as a thumb 42, while the H/PC is firmly held in both hands. Without this secondary portion 33, it will be difficult for a user to aim the tip of a stylus 8 on the scroll buttons 38, 40 originally provided for activation by a stylus 8 by the application program 12. Also in such a circumstance, the user will have to hold the stylus 8 in one hand, and be left with only the other hand to support the H/PC. Such a method of operating a H/PC while on the move is awkward. The introduction of the secondary portion 33 which allows commonly used inputs to be activated or actuated by a digit on a hand holding the H/PC results in a more user-friendly interface for the H/PC.

In the device driver 10, the main and secondary portions 32, 33 are split according to co-ordinates information. If one assumes an X-axis running horizontally across the input panel in a direction indicated by arrow 44 (FIG. 4), the main and secondary portions 32, 33 can be split along an imaginary partitioning line 46 across the X-axis at a particular X-value. Preferably, this split would leave a secondary portion 33 of about an inch in width, which would be suitable for most applications. However, the width of the secondary portion 33 can be changed depending on the display and input requirements of an application. Any input detected to the left on this imaginary partitioning line 46 will be considered as input on the main portion 32. Likewise, any input to the right of the line 46 is considered as input on the secondary portion 33. In this preferred embodiment, the secondary portion 33 does not fully replace the main portion 32 as an input panel to allow a user to interact with an application. The secondary portion 33 provides an alternative input means in this preferred embodiment to support a second set of commands which is selected from the first set. After the input panel is configured, the mode of the input panel is updated to reflect the new partitioned configuration. The next time when this RECONFIGURE DEVICE DRIVER step 31 is performed, the partitioning configuration is bypassed if the mode reflects that the input panel is already in the partitioned configuration.

After the RECONFIGURE DEVICE DRIVER step 31, the sequence 20 proceeds to the CONVERT INPUT TO API step 30. This step determines if the touch is in the main portion 32 or in the secondary portion 33. If it is determined that the input is on the main portion 32, the input will be processed according to methods commonly known to those skilled in the art. The most common of such methods is for the device driver 10 to send information, such as information regarding the location of the touch and whether the touch is a single tap or a double tap, to the application program 12. The application program 12 on receiving the information processes the information accordingly.

If it is determined in the CONVERT INPUT TO API step 30 that an input is detected on the secondary portion 33, the device driver 10 can process the information in several ways according to the needs of the application program 12. For a secondary portion 33 used for displaying enlarged indicia 34, 36 as described earlier for the preferred embodiment, the same method of handling input as described for the main portion 32 is also applicable to this secondary portion 33. This secondary portion 33 can also be used for capturing other types of input, such as gestures and handwritings, as are known to those skilled in the art. The device driver 10 interprets and converts these types of captured input on the secondary portion 33 to one or more appropriate application-programming-interface (API) calls for the application program 12 to act on the input. The application program 12 then processes the input according to these API calls. After the input is acted upon, the sequence 20 returns to the INPUT EVENT TRIGGERED? step 26 to wait for a next user input.

Other changes in form and detail may be made to the above-described preferred embodiment. For example, since the application program controls the indicia displayed in the secondary portion 33, the application program 12 can selectively display appropriate indicia according to macros and scripts selected to be activated from the secondary portion.

Figure 6:
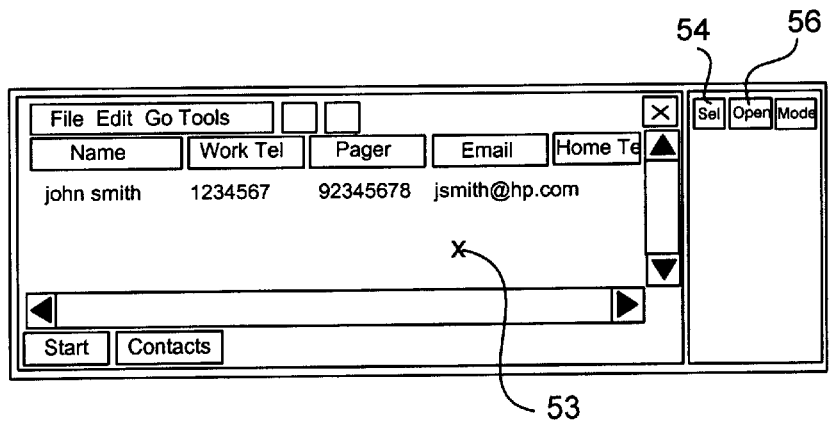
FIG. 6 is another example of a screen display associated with the use of a partitioned input panel.

As another example, instead of the secondary portion 33 being able to receive only a selected set of input commands, the secondary portion can be appropriately changed to receive input commands in addition to those that can be received by the main portion 32. As an example, a mode indicium 52 may be included in the secondary portion 33 in addition to the enlarged scroll indicia 34, 36. When this mode indicium is activated, the secondary portion 33 may go into a new mode. FIG. 6 shows a suitable display of such a new mode. This new mode can contain other indicia which when activated cause other actions corresponding to these other indicia to be performed. Alternatively, the secondary portion 33 may go into a mode which allows an object such as a thumb to move on the secondary portion 33 to position a cursor 53 in the main portion 32. Other indicia such as a select button 54 and an open button 56 displayed in this mode can allow, for example, a Contacts record in a Contacts application to be selected and opened for editing.

Figure 7:
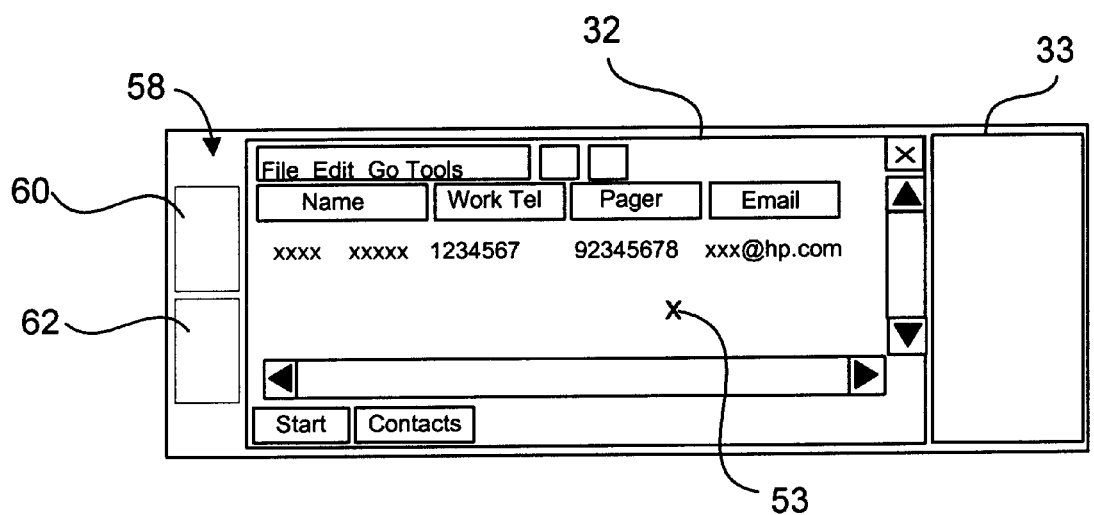
FIG. 7 is yet another example of a screen display associated with the use of a partitioned input panel.

FIG. 7 shows a display of a suitably partitioned input panel used for receiving mouse-like inputs. The secondary portion 33 can be used solely for the positioning of a cursor 53 and a third portion 58, for example, to the left of the main portion 32 can be used to receive mouse-like left-button 60 and right-button 62 inputs.

In the preferred embodiment, the secondary portion 33 is shown configured on the right of the main portion 32. This secondary portion 33 can be user-configured to be anywhere on the input panel. For example, a left-handed person may prefer to have a secondary portion 33 to the left of a main portion 32.

We claim:

1. An input and output system of an electronic device which is used for executing an application software comprising:
   a display panel for the application software to display information; and
   an input touch panel overlying the display panel, whereby the input touch panel is contiguously partitioned to include:
   a first input portion for receiving a first plurality of input commands; and
   a second contiguous and separate input portion for receiving a second plurality of input commands selected from the first plurality of commands whereby the second input portion is invoked only if required by the application software and is digitally accessible by a hand holding the electronic device.

2. The input and output system according to claim 1, wherein a portion of the display panel under the second input portion has indicia displayed on it to serve as a user-guide.

3. The input and output system according to claim 1, wherein the second plurality of input commands include gesture activated input commands.

4. The input and output system according to claim 1, wherein the first input portion is substantially larger than the second input portion.

5. The input and output system according to claim 1, wherein the location of the second input portion is configurable with respect to the first input portion.

6. A method of using an input touch panel on an electronic device for executing an application software, the method comprising the steps of:

contiguously partitioning the input touch panel into a first input portion and a second contiguous and separate input portion for interacting with the application software;

receiving a first plurality of input commands through the first input portion; and receiving a second plurality of input commands which are selected from the first plurality of commands through the second input portion whereby the second input portion is invoked only if required by the application software and is digitally accessible by a hand holding the electronic device.

7. The method according to claim 6, further comprising a step of determining if a partitioned input touch panel is required by the application software prior to the step of partitioning the input touch panel.

* * * * *